Figure 1:
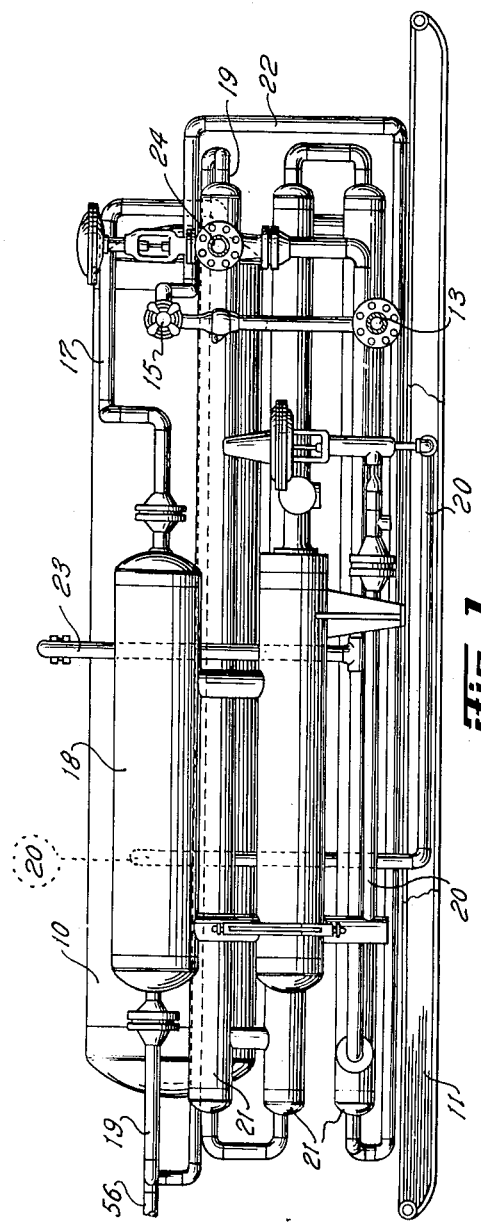

Dec. 27, 1955 J. L. MAHER 2,728,406
LOW TEMPERATURE SEPARATION PROCESSES AND UNITS
Filed Sept. 25, 1953 3 Sheets-Sheet 1

INVENTOR.
Joseph L. Maher
BY
Ahley & Ahley
ATTORNEYS

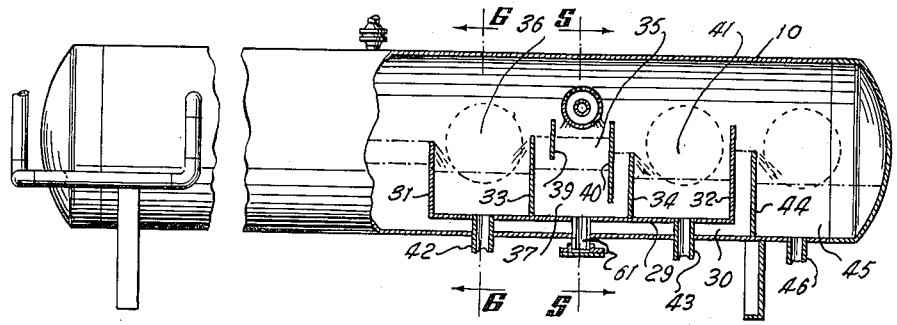
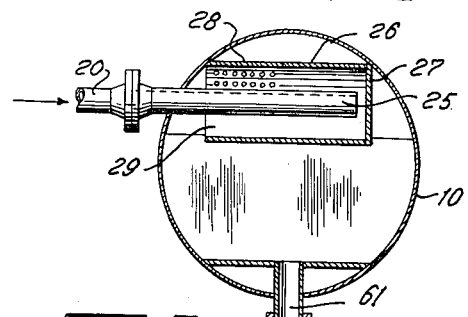
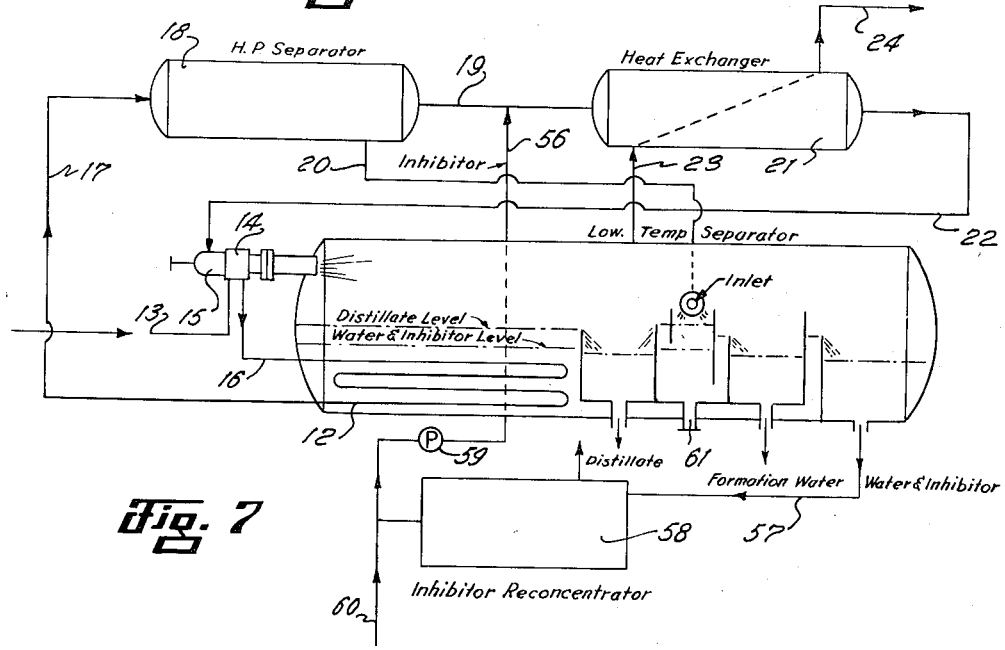

Dec. 27, 1955  J. L. MAHER  2,728,406
LOW TEMPERATURE SEPARATION PROCESSES AND UNITS
Filed Sept. 25, 1953  3 Sheets-Sheet 3

INVENTOR.
Joseph L. Maher
BY
*Ahley & Ahley*
ATTORNEYS

United States Patent Office 2,728,406
Patented Dec. 27, 1955

2,728,406

LOW TEMPERATURE SEPARATION PROCESSES AND UNITS

Joseph L. Maher, Tulsa, Okla., assignor to National Tank Company, Tulsa, Okla., a corporation of Nevada Application September 25, 1953, Serial No. 382,392

14 Claims. (Cl. 183—2.7)

This invention relates to new and useful improvements in low temperature separation processes and units.

The invention is primarily concerned with low temperature separation and low temperature separators as applied to the hydrocarbon-containing fluids produced from oil or petroleum wells, especially those wells producing a high gravity or distillate type petroleum product. It has been found desirable to employ low temperature separation or low temperature separation units, under certain conditions, in the recovery of valuable, condensable hydrocarbons from this type of well production which normally flows at relatively high pressures and contains high percentages of fixed gases such as methane and ethane. It has become conventional to pass such a well stream through a high pressure separator wherein the stream is resolved into its liquid and vapor components or portions, the liquid portion being passed directly to a low temperature separator while the vapor portion undergoes regenerative cooling and pressure reduction or expansion before admission to the low temperature separator. Due to the quite considerable cooling or chilling thus achieved in the vapor portion, considerable quantities of hydrocarbons and aqueous materials are condensed therefrom, this condensed material being separated from the gas stream in the low temperature separator, allowed to stratify, and withdrawn separately. Heretofore, the liquid portion separated in the high pressure separator has been allowed to commingle with the condensates in the low temperature separator, and several disadvantages have resulted, as will be pointed out more fully hereinafter.

The formation fluids in a high pressure, distillate type reservoir are believed to be largely if not entirely in the gaseous state. There may, however, be present some liquid hydrocarbons, and especially some connate or formation water which contains dissolved salts. Further, when the well is first completed and production thereof is commenced, there will be present in the well quantities of drilling mud and other materials introduced into the well during the drilling operation. For these various reasons, the stream flowing from the well at the ground surface will not always consist of pure hydrocarbons and pure water or water vapor, but may include water having dissolved salts or drilling mud or both therein. Further, the hydrocarbons may contain some wax or gum which may be separated out with the liquids in a high pressure separator.

From the foregoing, it is clear that the liquid portion removed from the well stream in the high pressure separator may contain various contaminants or undesired materials which adversely affect the operation of the low temperature separator when introduced thereinto and allowed to commingle therein with the liquids separated from the vapor or gaseous portion of the stream. Hence, it is desired that such commingling be avoided.

There is another set of circumstances under which indiscriminate mixing of the various well fluids becomes undesirable which occurs when a glycol or other antifreeze material or hydrate inhibitor, is added to the well stream for the control of freezing or hydrate formation, or for any other purpose. Low temperature separation systems depend upon a quite large reduction in the temperature of the flow stream to effect condensation of desirable hydrocarbons. This temperature reduction may readily be achieved if the well flowing pressure is sufficiently high, and if the permissible pressure of discharge of gas from the separation system is sufficiently low. Thus, if such a system is processing a well stream flowing at 2500 or 2800 pounds per square inch, and is discharging denuded gas into a natural gas pipe line at a pressure of 1000 or 1200 pounds per square inch, there is available a sufficient pressure drop to permit taking advantage of the Joule-Thompson effect and to obtain the desired chilling of the gas stream through pressure reduction. As, however, a well is produced and the flowing pressure thereof decreases, other steps must be taken to obtain the necessary temperature drop in the flow stream. These cooling adjuncts normally take the form of natural or artificial refrigeration of the flow stream, or more usually, cooling by regenerative heat exchange. The low temperature separator normally operates at a very low temperature, which may be well below the freezing point of water, and the gas being taken off from this separator for delivery to a pipe line is correspondingly cold. This cold gas may be passed through a heat exchanger and employed therein to chill the incoming gas stream prior to the pressure reduction of the latter, and in this manner, adequate cooling of the incoming gas stream may be obtained with a fairly low pressure reduction of the order of several hundred pounds per square inch. This expedient, on the other hand, has its own disadvantage in that natural gas streams under high pressure will form gas hydrates at temperatures well above the freezing point of water. The conventional low temperature separation system is adapted to handle or cope with gas hydrates only within the low temperature separator, and formation of hydrates in the system in advance of the separator will normally cause the components of the system to become clogged with gas hydrate particles, and hence become inoperative. The temperature at which gas hydrates form under a given pressure have been reasonably well established, and it is known that the incoming gas stream must not be chilled to a temperature below that at which the gas hydrates will form until just prior to the discharge of the gas stream into the low temperature separator. The formation of hydrates has thus placed a lower limit upon the chilling which may be achieved through regenerative heat exchange. As a solution, diethylene glycol or some other suitable antifreeze agent or dehydrating material, has been injected into the gas stream in advance of the heat exchanger in order that the gas stream may be chilled to lower temperatures in the heat exchanger and a greater overall temperature drop obtained. Because of its cost, this inhibiting material or other additive employed, must be recovered and recirculated in the system. Conventionally, the additive is watermiscible and is recovered by a simple reconcentration or evaporation process carried out upon the aqueous material withdrawn from the low temperature separator. The presence of gums or waxes, dissolved salts, drilling mud, and other contaminants in this withdrawn aqueous material greatly impedes the efficient recovery of the inhibitor or additive therefrom, sometimes substantially precluding such recovery, and at other times adversely affecting the efficiency or completeness of such recovery.

Since the inhibitor is injected into the gas stream after it has passed through the high pressure separator, all of the water present in the gas stream at that point is pure water in the vapor state. Quantities of this water are condensed from the gas stream in the low temperature separator, and the inhibitor is normally recovered in solution or in a commingled state with this condensed water. The reconcentration of the additive by the evaporation of pure water therefrom does not pose any large problem, and hence, if this latter liquid can be protected against contamination by the liquids removed in the high pressure separator, the problems encountered in recovery of the inhibitor, as well as in the continued efficient operation of the system may be avoided.

It is, therefore, the principal object of this invention to provide an improved low temperature separation process and unit wherein the well stream is passed through an initial separation step to remove therefrom all liquids present at that point, and wherein these separated liquids are resolved into their hydrocarbon and aqueous components with the aqueous portion being separately withdrawn and held apart at all times thereafter from other liquids separated in the process or unit.

A particular object of the invention is to provide a method and means of the character described wherein an inhibitor or other additive material may be commingled with the well stream following the separation of liquids therefrom, and may subsequently be recovered and recirculated for further use without interference from the liquids removed in the initial separation step.

Yet an additional object of the invention is to provide a device of the character described in which the well fluids are so handled that any solids or contaminants present therein are excluded from steps in the process or portions of the apparatus wherein the presence of such solids or contaminants would impair the overall operation.

Still another object of the invention is to provide an improved low temperature separation method and means wherein a well stream is separated into a liquid and a vapor portion, the vapor portion is chilled and condensed liquids removed therefrom with the condensed liquids being stratified into hydrocarbon and aqueous layers, and the liquid portion is separately stratified into hydrocarbon and aqueous layers, the hydrocarbon layers being withdrawn together and the aqueous layers being withdrawn separately and individually whereby contamination of the hydrocarbon layers or the aqueous layer removed from the vapor portion by the aqueous layer removed from the liquid portion is avoided.

A construction designed to carry out the invention will be hereinafter described together with other features of the invention.

Figure 2:
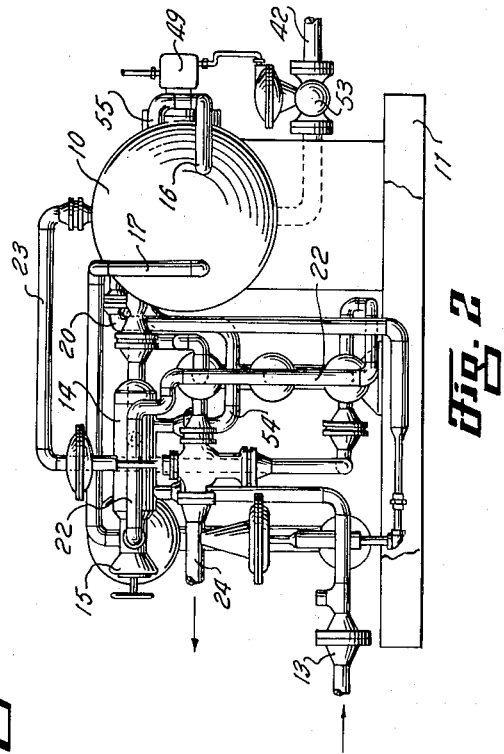
Figure 6:
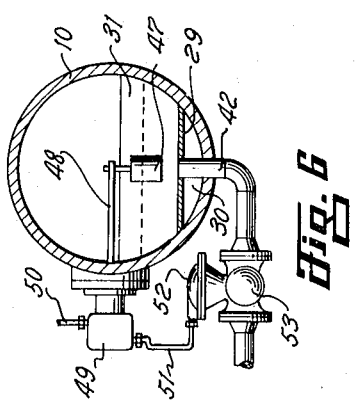
Figure 3:
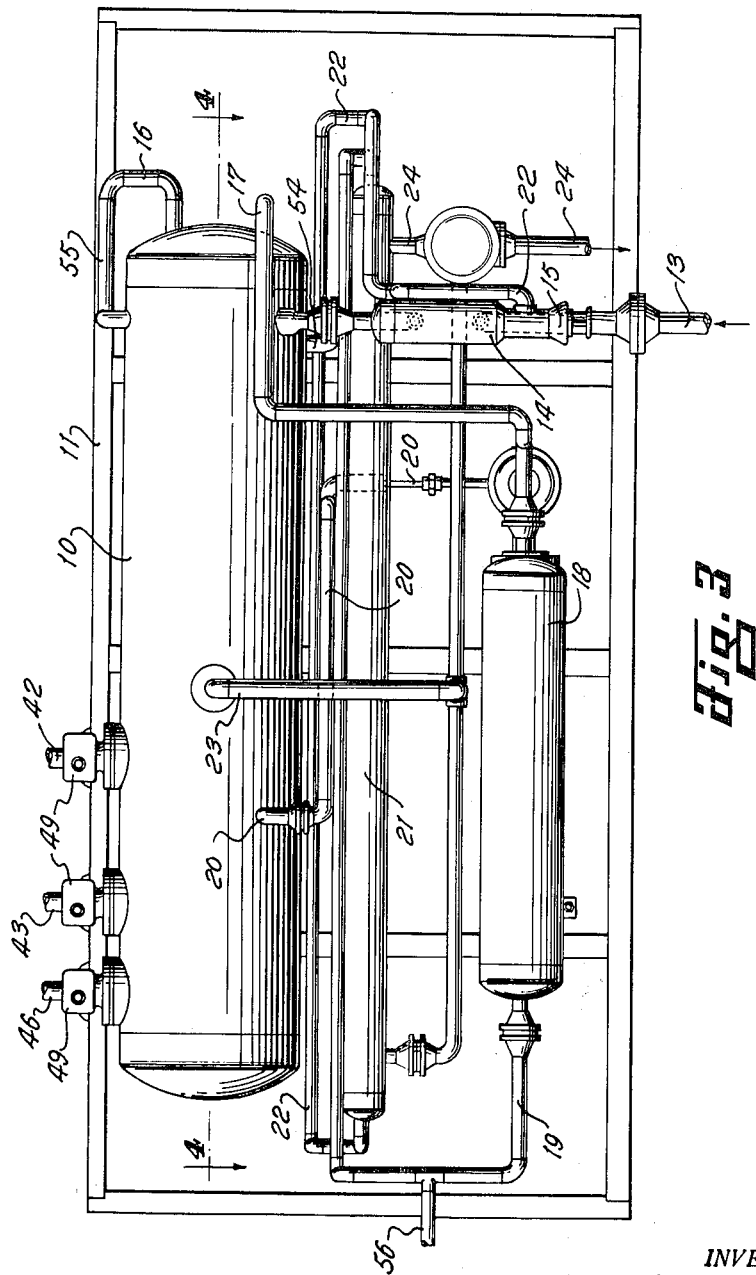

The invention will be more readily understood from a reading of the following specification and by reference to the accompanying drawings, wherein examples of the invention are shown, and wherein:

Fig. 1 is a side elevation of a low temperature separation unit constructed in accordance with this invention and adapted to carry out the method herein disclosed, Fig. 2 is a righthand end elevation of the separation unit, Fig. 3 is a plan view of the unit, Fig. 4 is a vertical, longitudinal sectional view of the low temperature separator, the view being taken upon the line 4—4 of Fig. 3, Fig. 5 is a vertical, cross-sectional view taken upon the line 5—5 of Fig. 4, Fig. 6 is a vertical, cross-sectional view taken upon the line 6—6 of Fig. 4, and Fig. 7 is a diagrammatic view illustrating the flow diagram of the system, and further illustrating a modification of the method and means herein set forth.

The basic structures and arrangements herein involved are disclosed in the copending application of Jay P. Walker et al., Serial No. 316,632, filed October 24, 1952, and reference is made to that application. The present application discloses specific improvements over and adjuncts to the aforesaid application, as defined by the claims appended hereto. The general aspects of the basic structure and arrangements are claimed in the above-identified copending application.

In the drawings, the numeral 10 designates an elongate horizontal vessel suitably mounted upon a base or skid 11. The vessel 10 comprises a low temperature separator having a set of heating coils, or other heating means 12 in the lower portion thereof (Fig. 7).

Referring to Fig. 7 to illustrate the process and the general composition of the system herein involved, the well stream, which may consist of liquid, gas, and solid particles or material, flowing under a pressure of a thousand or several thousand pounds per square inch, is admitted through an inlet conductor 13 to the heating jacket 14 of a pressure reducing choke 15. From the jacket 14, the fluid flows by a conductor 16 through the coils 12 and thence through a pipe or conductor 17 to the inlet of a high pressure separator 18. This well fluid will have an appreciable temperature, or may have been artificially heated after leaving the well bore, and hence will be sufficiently warm as to supply heat to the jacket of the choke 15 as well as to the coils or other heating means 12 in the lower portion of the separator vessel 10.

The well stream is separated in the high pressure separator 18 into a gaseous or vapor portion leaving the separator through a pipe 19, and a liquid portion which is drained from the separator through an outlet conductor 20. The vapor portion is conveyed by the pipe 19 to a heat exchanger 21, and from the heat exchanger, the vapor portion flows by a pipe 22 to the inlet of the choke 15. The temperature of the vapor portion is reduced in the heat exchanger and further reduced by the predetermined pressure drop obtained in the choke 15 whereby this portion enters the low temperature separator 10 from the choke in a considerably cooled or chilled condition. As common in this type of system, the chilling results in the condensation of desirable hydrocarbons from the vapor portion, along with the condensation of water and/or the formation of ice or gas hydrates. The gas and liquids are separated in the vessel 10, the cold gas being drawn off through an outlet pipe 23 and conducted through the heat exchanger 21 before discharge through a gas outlet pipe 24 leading to a gas transmission pipe line or other point of disposal of the separated gas. The separated liquids fall to the bottom of the separator 10 into adjacency with the heating means 12 and are thereby warmed so as to melt any ice or hydrates which may be present. It is to be noted that the aqueous portions thus introduced into the separator 10 will consist essentially of pure water since these aqueous portions have been condensed from a vapor state in the vapor portion entering through the choke 15. Hence, this water or aqueous material will be free of solids and foreign matter, dissolved salts and the like.

The liquid portion removed in the high pressure separator 18 is conveyed by the pipe 20 to an inlet pipe 25 (Fig. 5) extending horizontally and transversely of the vessel 10 and positioned in the upper portion thereof remote from the inlet of the choke 15. Since this liquid portion will be flowing under the impetus of the considerable pressure drop existing between the high pressure separator 18 and the low temperature separator vessel 10, it is desirable to provide suitable means for reducing the velocity of flow of the incoming liquid and for bringing said velocity within controllable limits to preclude undue violence and agitation within the separator 10. Any suitable or desirable means may be employed for this purpose, it having been found efficacious to surround the open-ended inlet pipe 25 with a perforated, cylindrical jacket or sleeve 26 having a closed bottom 27 adjacent the open end of the pipe 25 and against which the incoming liquids are jetted. The liquids are thus forced to undergo a complete change of direction, are admitted into a somewhat larger but still confined space within the sleeve 26, and are allowed to pass through the perforations 28 of said sleeve, as well as the open end 29 thereof under reduced and manageable velocities. Obviously, any other suitable or adequate type of inlet means may be employed.

For the purposes of permitting the separate withdrawal of the hydrocarbon and aqueous phases separated from the gas portion of the well stream, as well as permitting the separation and separate handling of the hydrocarbon and aqueous portions entering the separator through the pipe 20, there is provided within the separation zone constituted by the separator 10 an elongate classifier or classification section formed by a plurality of partitions which define a plurality of compartments within the separator. While the classifier is subject to much modification, a specific form thereof is illustrated in Fig. 4 and includes a transverse, horizontal partition or bottom plate 29 extending longitudinally of the vessel 10 and spaced above the bottom thereof to form a shallow flow passage 30 between said bottom plate and the bottom of the separator vessel. The bottom plate 29 extends from a point near the medial portion of the separator vessel to a point near the outlet end thereof opposite the end through which the choke 15 opens, there being an upright, transverse partition 31 projecting upwardly from the medial end of the plate 29, while a similar partition 32 projects upwardly in the separator vessel from the end of the plate adjacent the end wall of the vessel 10.

The inlet pipe 25 extends transversely over the medial portion of the bottom plate 29, the bottom plate carrying a second pair of upstanding, transverse partitions 33 and 34, respectively, which define or partition off a separating sump 35 which underlies the inlet pipe 25. The bottom plate thus carries four upstanding partitions or weir elements which define and form the walls of an open-top trough divided into three compartments or enclosed spaces within the separator 10. These sumps or compartments are each adapted to receive one of the well fluids and to isolate said fluids one from another in order to carry out the purposes of this invention.

The upstanding partitions 31 and 33 enclose a hydrocarbon phase sump 36 into which hydrocarbon liquids flow from the sump 35 and from the body of liquids in which the heating coil 12 is immersed. As shown in Fig. 4, the upper edge of the partition 31 terminates adjacent the center of the separator vessel 10, and hydrocarbon liquids which are condensed from the vapor portion entering the separator through the choke 15 and which fall into the lower portion of the vessel, accumulate therein and float upon a body of separated water or aqueous material at a level even with the upper edge of the partition 31. As additional hydrocarbon liquids accumulate, the liquids are skimmed over the top edge of the partition 31 and flow into the sump 36. The sump 35, which is adapted to confine a lower strata of water 37 and an upper strata of hydrocarbons 38, contains a pair of vertical, transverse baffle elements, one upon each side of the inlet pipe 25. The baffle 39, adjacent the partition 33, extends from above the surface of the hydrocarbon strata 38 to a point above the interface between the two strata, while the baffle 40, adjacent the partition 34, extends from a point within the water stratum upwardly to substantially the same horizontal plane as the upper edge of the baffle 39. With this arrangement, as liquids fall into the sump 35 from the inlet pipe 25 and stratify into water and oil layers, the oil or hydrocarbons are drawn off beneath the baffle 39 and pass over the upper edge of the partition 33 into the sump 36. The water or aqueous material is withdrawn under the lower edge of the baffle 40 and flows upwardly and over the upper edge of the partition 35 into the sump 41 enclosed between the partitions 32 and 34. The sumps 36 and 41 are provided with suitable discharge pipes 42 and 43, respectively, through which liquids may be withdrawn from these sumps.

The water separated from the incoming vapor portion is drawn off from the lower portion of the separator vessel and flows through the passage 30 beneath the bottom plate 29. Adjacent the outlet end of the separator 10, and spaced from the partition 32, there is provided an upstanding partition or weir plate 44 projecting upwardly from the bottom of the vessel 10 and terminating in a horizontal plane slightly below the horizontal plane of the upper edge of the partition 31. Thus, the water or aqueous material flowing through the passage 30 may move upwardly and overflow the upper edge of the partition 44 to enter into the sump 45 enclosed between said partition and the end wall of the vessel. These liquids are removed from the sump through an outlet pipe 46.

The discharge of liquids through the three outlets 42, 43 and 46 may be regulated or controlled in any desirable fashion, a preferred structure having been illustrated in Fig. 6. Since the structure for all three sumps is substantially identical, only a typical structure has been shown, this being the discharge arrangement for the sump 36. As illustrated, a float 47 is disposed in the sump and carried upon an arm 48 actuating a pilot valve 49. The pilot valve 49, in turn, regulates the supply of gas or fluid under pressure from a supply pipe 50 to a pipe 51 leading to the diaphragm structure 52 of a diaphragm drain valve 53. In the conventional manner, vertical movement of the float 47 actuates the pilot valve 49 and admits to or excludes from the diaphragm of the valve 53 gas or other pressure fluid to open and close the valve and control the discharge of liquid from the sump to maintain the desired level therein.

While the invention is applicable in all methods and to all units of this type, the arrangement and interconnection of the various system components in a specific embodiment of the invention has further been illustrated in Figs. 1, 2 and 3. For convenience and portability as well as compactness of structure, the system is desirably arranged upon the skid or base unit 11, the low temperature separator 10 being in the form of an elongate, horizontal vessel supported at one side and along one longitudinal edge of said base. As illustrated in the aforesaid figures, and employing so far as possible the same numerals heretofore applied to the system components, the incoming well fluid is introduced into the system through the inlet pipe 13 and flows into the jacket 14 of the variable choke structure 15. The well stream then passes from the jacket by a conductor 54 through the separator vessel 10 in order to supply heat to certain structures therein which are not illustrated, and then flows by a pipe 55 to the pipe 16 which communicates with the heating coils in the bottom of the separator vessel. From the coils, the fluid exits by the conductor 17 which leads to the high pressure separator 18. From that point, the flow of the various fluids and well stream components is substantially the same as that previously described in connection with Fig. 7, and the same numerals have been applied to Figs. 1, 2 and 3 in order to identify the various portions of the structure.

As pointed out hereinbefore, it sometimes becomes desirable to add an anti-freeze agent or hydrate inhibitor, or other additive material, to the vapor portion of the well stream as the latter is drawn off of the high pressure separator and before it enters the heat exchanger. As shown in Figs. 7 and 3, the inhibitor is introduced into the pipe 19 through a branch connector or conduit 56 whereby the inhibitor or additive is directed into the pipe 19 and commingled with the vapor portion flowing therethrough. Normally, this material, which may be diethylene glycol, triethylene glycol, calcium chloride brine, or other suitable material such as are well known in this art, is water miscible and hence concentrates almost exclusively in the aqueous portion of the flow stream. As the vapor portion is cooled in the heat exchanger, and as it is further cooled in the choke 15, both hydrocarbon and aqueous liquids will condense and the inhibitor will concentrate in the aqueous portion. Hence, the inhibitor or additive will be drawn off from the sump 45 through the outlet 46 along with the aqueous or water phase.

This withdrawn material is conducted by a pipe 57 to an evaporative or reconcentrating unit 58 in which the additive material is recovered for recirculation. In the usual installation, the material flowing to the reconcentrator is a simple mixture of water and an inhibitor such as diethylene glycol, and it is only necessary to supply heat to this liquid mixture to evaporate water therefrom and bring the concentration of glycol up to the desired level. The reconcentrated inhibitor or additive is then simply reintroduced into the pipe 56 by means of a pump 59. As additional quantities of inhibitor become necessary for make-up purposes, this material may be added through a branch conductor 60 suitably connected into the system.

It is quite apparent that should an inhibitor such as diethylene glycol become mixed with water containing dissolved salts, a reconcentration by simple heating and evaporation would not be feasible. Such evaporation would not drive off the dissolved salts and would merely concentrate the salts in the glycol to the point where the inhibitor would not be usable, and such action would take place very rapidly. Similarly, drilling mud, waxes or gums, and other contaminant materials would render the inhibitor unfit for use and prevent the recirculation and reuse of the inhibitor. Due to the cost of these additive materials, it is essential that they be recovered and recirculated in order that an economical operation may be carried out. Otherwise, the cost of the additive would not be offset by the increased recovery of hydrocarbons which would be obtained, and it would not be economically feasible to employ an inhibitor in the system.

It is further to be noted that the liquid portion removed in the high pressure separator 18 is prevented from commingling with the fluids in the main body of the low temperature separator 10 wherein ice and/or gas hydrates normally occur. This foreign matter is thus prevented from coating the surfaces of the heating coil 12 or other portions of the apparatus, from concentrating in the interface between the hydrocarbon and water layers and thus preventing adequate heating of the gas hydrates to melt the same, and otherwise impeding the desired functioning of the system. Instead, this liquid, which may carry contaminants, is excluded and held apart from the other fluids in the system and from the other system components or structures, and is so handled that solids or dissolved materials are not afforded an opportunity of interference with proper operation.

Any solids, such as particles of drilling mud, entering the sump 35 will fall to the bottom thereof and may be removed periodically through a drainage outlet 61. Solutes and material in suspension carried into the sump 41 with the aqueous phase will be drained from the sump along with the water and aqueous material through the outlet 43 and hence will not have an opportunity of accumulating within the sump to an extent sufficient to impair operation of the system.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a low temperature separation process wherein a petroleum well stream is initially separated into a vapor portion and a liquid portion with the vapor portion then being cooled and introduced into a separation zone wherein condensed liquids are separated from the vapor and drawn off as separate hydrocarbon and aqueous phases, the improvement including the steps of, separately withdrawing the separated liquid portion from the first-named separation step, conveying the liquid portion to the separation zone and therein separating said liquid portion into hydrocarbon and aqueous phases while maintaining the liquid portion apart from the vapor portion, withdrawing the separated hydrocarbon phases from the separation zone, and withdrawing the separated aqueous phases individually from the separation zone.

2. The method as set forth in claim 1, and introducing a hydrate inhibitor into the vapor portion prior to the introduction of the latter into the separation zone.

3. The method as set forth in claim 2, and cooling the vapor portion by heat exchange and pressure reduction after the introduction thereinto of the inhibitor and prior to the introduction of said vapor portion into the separation zone.

4. The method as set forth in claim 2, and withdrawing the hydrate inhibitor from the separation zone with the aqeous phase separated therein from the vapor portion, and returning the withdrawn inhibitor to the vapor portion.

5. The method as set forth in claim 2, and withdrawing the hydrate inhibitor from the separation zone with the aqueous phase separated therein from the vapor portion, reconcentrating the inhibitor, and returning the reconcentrated inhibitor to the vapor portion.

6. In a low temperature separation process wherein a petroleum well stream is initially separated under high pressure into a vapor portion and a liquid portion, a hydrate inhibitor is commingled with the vapor portion, the vapor portion is then passed in heat exchange with a cold gas, the vapor portion is then reduced in pressure and introduced into a separation zone wherein condensed liquids are separated from the vapor portion and stratified into separate hydrocarbon and aqueous phases, the balance of the vapor portion which comprises cold gas is drawn off and passed in heat exchange with the vapor portion, the improvement including the steps of withdrawing the liquid portion from the high pressure separation step, reducing the pressure on the liquid portion and introducing said portion into the separation zone, stratifying the liquid portion in the separation zone into hydrocarbon and aqueous phases while maintaining said portion separate from the vapor portion and the phases separated therefrom, withdrawing the hydrocarbon phases from the separation zone, withdrawing from the separation zone the aqueous phase stratified from the liquid portion, withdrawing separately from the separation zone the aqueous phase stratified from the vapor portion, withdrawing the inhibitor with the latter aqueous phase, reconcentrating the inhibitor, and returning the reconcentrated inhibitor to the vapor portion prior to the passage of the latter in heat exchange with the cold gas.

7. A low temperature separation unit including, an initial separator having a well fluid inlet for admitting a petroleum well fluid and having means for separating the well fluid into vapor and liquid portions, a low temperature separator, a vapor portion conductor leading from the initial separator to the low temperature separator, cooling means in said conductor, means for retaining in the low temperature separator a body of hydrocarbon and aqueous liquids which have been separated from the vapor portion, a liquid portion conductor leading from the initial separator to the low temperature separator and having an inlet to the latter separator, the low temperature separator having a compartment into which the inlet opens and in which the liquid portion separates into hydrocarbon and aqueous phases, the compartment having separate hydrocarbon phase and aqueous phase outlets, the low temperature separator having a second compartment into which the squeous phase outlet opens, means for drawing off liquid separately from the second compartment and discharging the liquid from the low temperature separator, and means for drawing off hydrocarbon and aqueous liquids and discharging the same from the low temperature separator, and a gas outlet from the low temperature separator.

8. A low temperature separation unit including, an initial separator into which a petroleum well fluid is introduced and separated into vapor and liquid portions, a low temperature separator, a vapor portion conductor leading from the initial separator to the low temperature separator, cooling means in said conductor, means for maintaining in the low temperature separator a body of hydrocarbon and aqueous liquids which have been separated from the vapor portion, a liquid portion conductor leading from the initial separator to the low temperature separator and having an inlet to the latter separator, the low temperature separator having a supplementary separator therein into which the inlet opens and in which the liquid portion separates into hydrocarbon and aqueous phases, means for drawing off separately the aqueous phase separated in the supplementary separator, and means for drawing off the aqueous phase separated from the vapor portion and the hydrocarbon phases separated from the vapor and liquid phases, and a gas outlet from the low temperature separator.

9. A low temperature separation unit as set forth in claim 8 wherein the supplementary separator includes, an open-top trough, partitions extending transversely of the trough and dividing the trough into compartments, the inlet from the liquid portion conductor overlying one of the compartments so as to discharge the liquid portion thereinto, and separate aqueous and hydrocarbon phase discharge means leading from the latter compartment to others of the compartments for the separate discharge of said phases to separate ones of the compartments.

10. A low temperature separation unit including, an initial separator into which a petroleum well fluid is introduced and separated into vapor and liquid portions, a low temperature separator, a vapor portion conductor leading from the initial separator to the low temperature separator, cooling means in said conductor, means for maintaining in the low temperature separator a body of hydrocarbon and aqueous liquids which have been separated from the vapor portion, a liquid portion conductor leading from the initial separator to the low temperature separator and having an inlet to the latter separator, the low temperature separator having therein a plurality of transverse vertical partitions defining between said partitions a plurality of open-top compartments, the inlet from the liquid portion conductor overlying one of said compartments so as to discharge the liquid portion thereinto, the partitions forming the latter compartment being of unequal height, and a vertical baffle in the latter compartment in a vertical plane between the inlet and the shorter partition, the baffle extending above the higher partition and terminating above the bottom of said latter compartment and a gas outlet from the low temperature separator.

11. A low temperature separation unit as set forth in claim 8, wherein the inlet from the liquid portion conductor comprises, a conductor extending transversely of the low temperature separator and having an open inner end, and a sleeve surrounding the latter conductor and having a closed bottom adjacent the open inner end of said latter conductor.

12. A low temperature separation unit as set forth in claim 8, wherein the inlet from the liquid portion conductor comprises, a conductor extending transversely of the low temperature separator and having an open inner end, and a perforated sleeve surrounding the latter conductor and having a closed bottom adjacent the open inner end of said latter conductor.

13. A low temperature separator as set forth in claim 8 wherein the means for drawing off aqueous liquids from the low temeprature separator includes a discharge conductor into which the aqueous liquids are conveyed from the low temperature separator, a hydrate inhibitor reconcentrator connected to the outlet of the latter discharge conductor, and an inhibitor recirculation conductor leading from the reconcentrator to the vapor portion conductor between the initial separator and the cooling means.

14. A low temperature separation unit including, an initial separator into which a petroleum well fluid is introduced and separated into vapor and liquid portions, a low temperature separator, a vapor portion conductor leading from the initial separator to the low temperature separator, cooling means in said conductor, means for maintaining in the low temperature separator a body of hydrocarbon and aqueous liquids which have been separated from the vapor portion, a liquid portion conductor leading from the initial separator to the low temperature separator and having an inlet to the latter separator, the low temperature separator having a supplementary separator therein into which the inlet opens and in which the liquid portion separates into hydrocarbon and aqueous phases, means for drawing off separately the aqueous phase separated in the supplementary separator, the low temperature separator having a space partitioned off from the balance of the separator for receiving the aqueous liquid separated from the vapor portion and having a passage leading to said space for conducting said aqueous liquid thereinto, a reconcentrator unit for reconcentrating an additive chemical, a discharge conductor leading from the aforementioned space to the reconcentrator, and a recirculation conductor leading from the reconcentrator to the vapor portion conductor for conveying the reconcentrated additive chemical into said vapor portion conductor, and a gas outlet from the low temperature separator.

References Cited in the file of this patent

UNITED STATES PATENTS

| | | |
|---|---|---|
| 677,358 | Hyde | July 2, 1901 |
| 1,921,279 | Anderson | Aug. 8, 1933 |
| 2,151,248 | Vaughan | Mar. 21, 1939 |
| 2,214,678 | Raigorodsky | Sept. 10, 1940 |
| 2,245,028 | Farris | June 10, 1941 |
| 2,345,426 | Pruiett et al. | Mar. 28, 1944 |
| 2,528,028 | Barry | Oct. 31, 1950 |
| 2,547,190 | Wilson | Apr. 13, 1951 |